United States Patent [19]
Stubbs

[11] 3,817,085

[45] June 18, 1974

[54] APPARATUS FOR COMPOSITION MEASUREMENT AND CONTROL OF BINARY GAS MIXTURES

[75] Inventor: Royston A. Stubbs, King City, Ontario, Canada

[73] Assignee: Her Majesty the Queen in right of Canada as represented by the Minister of National Defence

[22] Filed: Jan. 11, 1972

[21] Appl. No.: 216,958

[30] Foreign Application Priority Data
Jan. 11, 1971 Canada .............................. 102406

[52] U.S. Cl. ..................................... 73/23, 128/142
[51] Int. Cl. ............................................ A62b 7/02
[58] Field of Search........ 73/23, 40.5, 421.5, 205 L, 73/211, 30; 128/140 R, 142

[56] References Cited
UNITED STATES PATENTS

| | | | |
|---|---|---|---|
| 2,263,335 | 11/1964 | Heinz..................................... | 73/23 |
| 2,449,067 | 9/1948 | Guillemin .............................. | 73/23 |
| 3,086,386 | 4/1963 | Kapff ..................................... | 73/23 |
| 3,314,281 | 4/1967 | Reece et al............................. | 73/23 |
| 3,524,444 | 8/1970 | Ellard et al. ........................... | 128/142 |

FOREIGN PATENTS OR APPLICATIONS 1,427,971   1/1966   France .............................. 73/205 L

*Primary Examiner*—Richard C. Queisser
*Assistant Examiner*—Stephen A. Kreitman
*Attorney, Agent, or Firm*—R. S. Sciascia; P. Schneider; T. Watson

[57] ABSTRACT

For regulation or measurement of the composition of binary gas mixtures, the invention provides the series combination of a viscous pneumatic resistor (e.g., an elongated capillary tube) and a linear pneumatic resistor (e.g., a porous membrane), connected between a binary gas source and a gas sink, and having a measuring or regulating element responsive to pressure at the junction between the two resistors. Junction pressure varies as a function of the molecular weight of the gas, and thus if two gases of dissimilar molecular weights are mixed, a reading of junction pressure can be used to determine the relative amounts of the two gases in the mixture, or the pressure can be used directly in apparatus for regulating the composition of the mixture.

10 Claims, 12 Drawing Figures

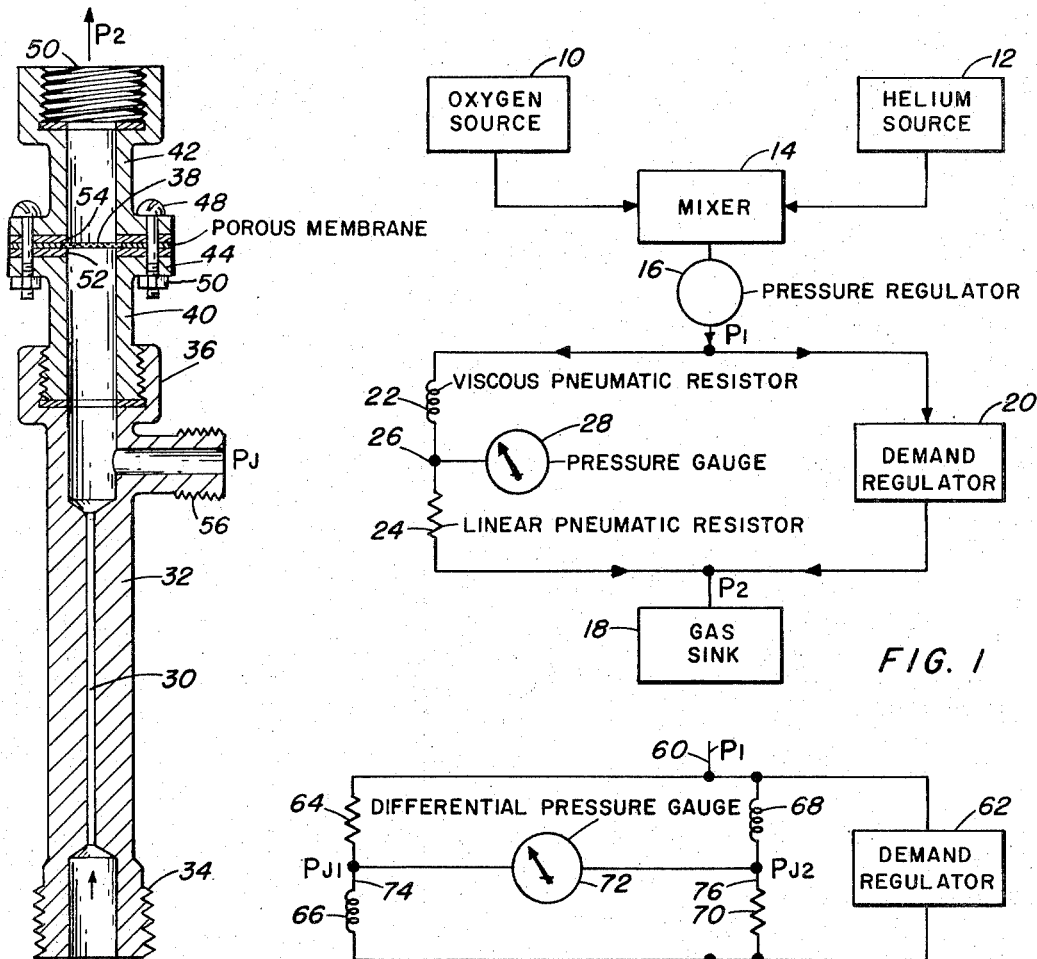
FIG. 1
FIG. 2
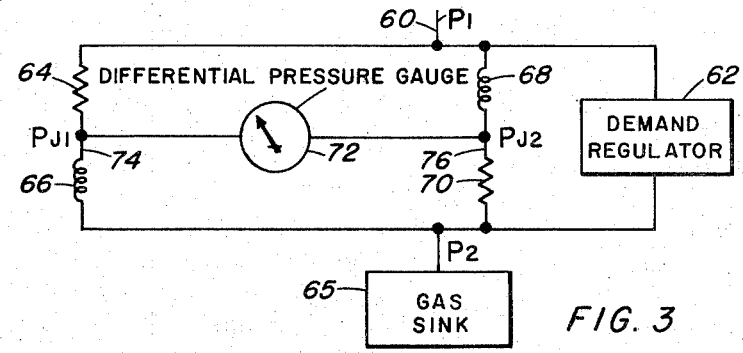
FIG. 3
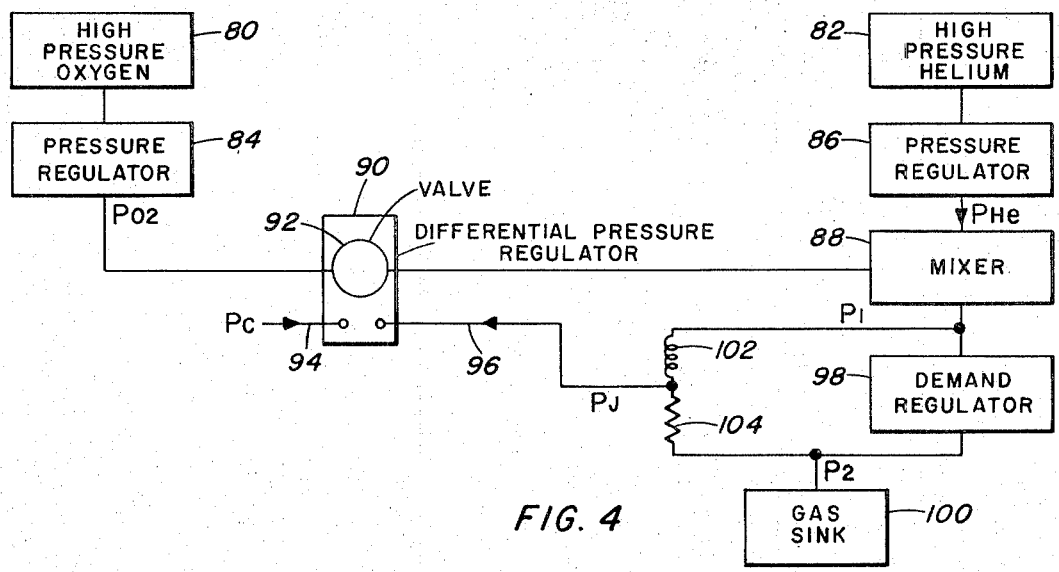
FIG. 4

APPARATUS FOR COMPOSITION MEASUREMENT AND CONTROL OF BINARY GAS MIXTURES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A. Field of the Invention

This invention relates to pneumatic devices suitable for use in the measurement of composition and composition controls of binary gas mixtures.

It is frequently desirable to ascertain the composition of a binary gas mixture, and sometimes to control the composition. For example, to provide a breathing mixture for divers, oxygen is conventionally mixed with helium in desired proportions, and the oxygen-helium mixture supplied to the divers. It is essential to be able to ascertain and to regulate the ratio of oxygen to helium in the mixture.

B. Description of the Prior Art

Regardless of the depth to which a diver descends, it is desirable to limit the partial pressure of oxygen in the breathing mixture to something less than about 1 atmosphere. When, for example, 2 atmospheres of oxygen are breathed, toxic effects occur in the human body, and gas permeability problems develop at the lung lining. It has been found that a breathing mixture incorporating about 0.4 to 1 atmospheres of oxygen is satisfactory for diving operations. The balance of the mixture is conventionally chosen to be helium. Heavier gases tend to be narcotic under pressure, and the only lighter gas, hydrogen, creates the risk of explosion when used with oxygen.

However, because in conventional diving operations, a diver may proceed from a surface pressure of 1 atmosphere to a depth of 1,500 feet at which the pressure is about 45 atmospheres, it is impossible to maintain the partial pressure of oxygen in the desirable 0.4 to 1 atmosphere range unless the oxygen-helium ratio in the breathing mixture is varied with the depth of the diver. At the surface, there may be (say) 0.5 atmospheres each of helium and oxygen, but at 1,500 feet, there must be about 44.5 atmospheres of helium to 0.5 atmospheres (say) of oxygen. Conventionally, polargraphic sensors or electrolytic sensors are used to measure the partial pressure of the oxygen. However, these sensors require a power supply, carefully calibrated electrical, electronic or chemical components, and have an uncertain lifetime. Because of the uncertain life time, it is standard practice to use as many as three sensors per diver to maintain adequate redundancy, so that if one of the sensors if faulty its signal can be ignored and the other two relied upon. The faulty sensor can then be replaced at the earliest possible opportunity.

SUMMARY OF THE INVENTION

It would be desirable to have a partial pressure monitor and regulator that would operate reliably, with an acceptably long lifetime, and without dependence upon an external power supply for its operation. The present invention attempts to satisfy these objects for the case in which the molecular weights of the component gases of the binary gas mixture are dissimilar. According to the present invention, the pressure monitor is entirely pneumatic — i.e., it operates entirely in response to gas flow and gas pressure in the pneumatic system. The apparatus according to the invention was designed with the diving industry specifically in mind, but the pneumatic circuits according to the invention may find application in other technical fields making use of binary gas mixtures, for example anesthetics and possibly rocketry and welding.

In its broadest aspect, the invention provides a pneumatic flow-path comprising the series combination of a viscous pneumatic resistor and a linear pneumatic resistor, which series combination is connected between a source of gas at one pressure and a gas sink at another (lower) pressure. Means are provided at the junction between the viscous pneumatic resistor and the linear pneumatic resistor for measuring or regulating the gas pressure at the junction. The junction pressure varies in predetermined manner with the molecular weight of the gas mixture, and, therefore, when binary gas mixtures having component gases of dissimilar molecular weights are used, the measurement of pressure at the junction enables the user to monitor the gas composition simply by reading the junction pressure. The pressure indicator can be calibrated so that the pressure reading gives a direct indication of the fraction in the mixture of each of the component gases.

In this application, the term "linear pneumatic resistor" means a device providing a confined gas flowpath through pores whose diameters are very small in comparison with the mean free path of the molecules in the gas mixture. The term "viscous pneumatic resistor" refers to a device providing a confined gas flowpath through one or more pores in which the length of the pore is much greater than its diameter, and the pore diameter is very large in comparison to the mean free path of the molecules of the gas mixture. The term "pneumatic flowpath" means a confined path through which gas can flow.

Further in accordance with the invention, it is possible to combine a pair of above-defined series combinations in parallel relationship but in mutually opposite orientation, to provide a greater "swing" in the junction pressure readings.

According to a further aspect of the invention, a pneumatic flowpath as described above can be used in conjunction with a pressure regulator to regulate the relative proportions of two gases in a binary gas mixture. Each gas is obtained from a separate source of the gas at a constant pressure. Conduits from the source lead to a mixing chamber, and in one conduit a differential pressure regulator is interposed to regulate the flow of that gas into the mixing chamber. The pressure regulator is responsive to two input pressures acting in opposition to one another, namely: (1) a command pressure which is preset by the operator and is dependent upon the desired relative proportions of the two gases in the mixture, and (2) the pressure at the junction of a pneumatic flowpath comprising the series combination of a linear and viscous pneumatic resistor as previously described. The differential pressure regulator regulates the flow from the source to which it is connected so as to tend to maintain the junction pressure in balance with the preset command gas pressure. The series combination is connected between the outlet of the mixing chamber and the consumer of the gas mixture (i.e., the gas sink). In this way the differential pressure regulator responds to the relative proportions of gas, which determines the junction pressure, in a closed feed back loop, thus permitting the relative proportions of the source gases in the gas mixture to be kept constant in dependence upon the command pressure set. The device operates solely upon the energy provided by the gas flow and requires no independent source of energy.

Finally, the invention provides a partial pressure regulating system for maintaining substantially constant the partial pressure of one of the two gases in the mixture. To this end, the regulator described in the preceding paragraph is modified by connecting a partial pressure regulator between the mixing chamber and the series combination. The partial pressure regulator responds to two pressures acting in opposition to one another, viz, (1) the pressure at the input end of the series combination, and (2) a pressure which is the sum of: (a) the gas sink pressure and (b) a preset pressure (which is preferably adjustable and may be mechanical — e.g., the force exerted by a spring). The partial pressure regulator passes gas to the series combination from the mixing chamber only when the second pressure exceeds the pressure at the series combination input. It has been found that this arrangement tends to keep substantially constant the partial pressure of the gas passing through the differential pressure regulator.

BRIEF DESCRIPTION OF THE DRAWINGS

The invention will now be described with reference to the accompanying drawings, in which:

FIG. 1 illustrates a binary gas composition measuring instrument according to the invention, in schematic block diagram form;

FIG. 2 illustrates an embodiment of a series combination of viscous pneumatic resistor and linear pneumatic resistor according to the invention;

FIG. 3 is a schematic block diagram of a differential pressure bridge for measuring bridge gas mixture compositions, according to the invention;

FIG. 4 is a schematic block diagram showing an embodiment of a binary gas mixture composition regulator in accordance with the present invention;

DESCRIPTION OF THE PREFERRED EMBODIMENT

Figure 5:
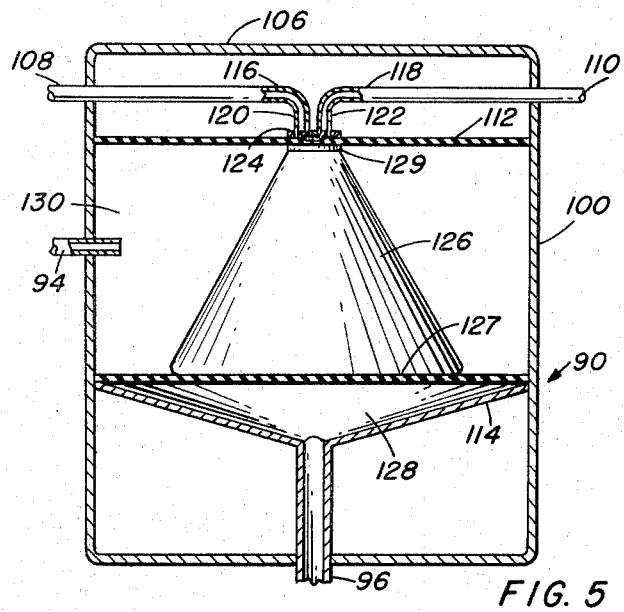
FIG. 5 is a schematic diagram of an embodiment of a differential pressure regulator suitable for use in the apparatus of FIG. 4.

Referring to FIG. 1 which shows a binary gas mixture composition measuring instrument according to the invention, two gases, for example oxygen and helium, are obtained from respective sources 10 and 12 and mixed in a mixing chamber 14. The gas mixture then passes through a conventional pressure regulator 16 for maintaining the gas mixture at a constant pressure $P_1$. The gas passes ultimately to a gas sink 18 at a pressure $P_2$ via a conventional demand regulator 20. For example, the "gas sink" may be a breathing diver, whose demand regulator supplies a breathing mixture to the diver in accordance with the demands made by the lungs of the diver.

To measure the relative proportions of oxygen and helium in the gas mixture passing out of the mixer 14 and pressure regulator 16, a small portion of the gas flow is diverted via viscous pneumatic resistor 22, which is schematically shown as a coil (like a conventional inductor in electrical circuit diagrams) which is connected in series with a linear pneumatic resistor 24, shown schematically as a sawtooth pattern (like an electrical resistor in conventional electric circuit diagrams). By "connection in series" is meant that the gas passing from the mixer 14 and pressure regulator 16 to the inlet of one of the resistors passes first through one of the two pneumatic resistors and then through the other of the two pneumatic resistors without diversion (and eventually escapes to the gas sink). Thus the inlet terminal of the viscous pneumatic resistor 22 is connected directly to the pressure regulator 16, and the outlet of the viscous pneumatic resistor 22 is connected at a junction 26 to the inlet of the linear pneumatic resistor 24. The outlet of the linear pneumatic resistor 24 is then connected directly to the gas sink 18. Thus the pressure prevailing at the inlet of the viscous pneumatic resistor 22 will be $P_1$ and the pressure at the outlet of the linear pneumatic resistor 24 will be $P_2$. A pressure gauge 28 is connected at the junction 26 to measure the pressure $P_J$ at the junction 26 between the two resistors.

A representative viscous pneumatic resistor-linear pneumatic resistor series combination is shown in more detail in FIG. 2. The viscous pneumatic resistor may comprise simply an elongated narrow tube 30 mounted in a pipe section 32 having threaded connecting terminals 34 and 36, (or instead an adjustable viscous pneumatic resistor, described below with reference to FIG. 8, may be used). In order for the elongated tube 30 to function properly as a viscous pneumatic resistor, two criteria must be observed: (1) the length of the tube must be very long in comparison with the diameter of the tube — for example, a tube length to tube diameter ratio of at least 100 to 1 should be satisfactory; and (2) the tube diameter of the pore 30 must be large with respect to the mean free path of the molecules in the gas mixture. For the gases oxygen and helium, for example, a tube diameter of 0.010 inches is satisfactory.

The mass flow of gas through the viscous pneumatic resistor is given by the following equation:

$$F_V = B(M/R_{TV})[(P_1 - P_J)(P_1 + P_J)/2] \qquad (1)$$

where $F_V$ is the mass flow of gas;
B is a constant dependent upon device geometry;
M is the molecular weight of the gas;
R is the ideal gas constant;
T is the absolute temperature;
V is the coefficient of viscosity of the gas; and
$P_1$, $P_2$ and $P_J$ are as defined above.

The linear pneumatic resistor can be in the form of a porous membrane 38 suitably supported against the pressure differential and mounted between two threaded pipe sections 40, 42 and sealed against the flanges 44 of the pipe sections 40 and 42 by means of bolts 48 and nuts 50 and O-ring gaskets 52 and 54. In order for the membrane 38 to function satisfactorily as a linear pneumatic resistor, the diameter of individual pores in the porous membrane should be very much smaller than the mean free path of molecular flow through the membrane. For example, for the gases helium and oxygen under consideration, a cellulose triacetate membrane having pore size diameter of about 70° angstrom units is satisfactory. To support the membrane, against the pressure, porous stainless steel discs having pores of about 1 micron may be placed on either side of the membrane.

In FIG. 2, the viscous pneumatic resistor housing is shown as having a threaded outlet 56 so that the pressure $P_J$ at the junction between the two pneumatic resistors can be measured. Obviously the outlet could have been provided at any other convenient place at the junction.

The mass flow of gas through the linear pneumatic resistor 38 is given by the following equation:

$$F_L = A \sqrt{M/RT} (P_J - P_2) \qquad (2)$$

where
$F_L$ is the mass flow of gas;
A is a constant dependent upon device geometry;
M, R, T, $P_2$ and $P_J$ are as defined previously.

Now, since the viscous pneumatic resistor 22 and linear pneumatic resistor 24 are connected in series in FIG. 1, it follows that the mass flow of gas through the two pneumatic resistors is the same. Accordingly, the value of $F_L$ in equation (2) is the same as the value $F_V$ in equation (1) for the series connection. It therefore follows that:

$$BM/2\ RTV \cdot (P_1 - P_J)(P_1 + P_J) = A\ \sqrt{M/RT} \cdot (P_J - P_2)$$

From this equation one obtains the following result:

$$P_J = -\frac{AV}{B}\sqrt{\frac{RT}{M}} + \frac{1}{2}\sqrt{\frac{(2AV)^2}{(B)} \cdot \frac{RT}{M}}$$

$$+ 4\left(P_1^2 + \frac{2AV}{B}\sqrt{\frac{RT}{M}} \cdot P_2\right) \qquad (3)$$

It thus follows that by measuring the pressure $P_J$ and knowing the nature (and particularly, the molecular weight and viscosity) of the two input gases, the relative proportions of the two gases in the gas flow passing through the series combination can be ascertained from equation (3).

The geometry constants A and B can be determined empirically, but are also related to pore dimensions as follows:

$A = \sqrt{\pi/3}\ \sqrt{2}\ d^3L/L_L$
$B = \pi/128\ d^4_V/Lv$ where
$d_L$ is the diameter of the linear pneumatic resistor pores;
$L_L$ is the length of the linear pneumatic resistor pores;
$d_V$ is the diameter of the viscous pneumatic resistor pores; and
$L_v$ is the length of the viscous pneumatic resistor pores.

Because equation (3) is rather unwieldy, an empirical calibration of the meter used to measure $P_J$ to correlate pressure changes with molecular weight changes is recommended. Variations in pressure $P_J$ can occur not only as a result of variations in molecular weight, but also as a result of variations in viscosity and in temperature. It is therefore necessary to keep temperature relatively constant, or at least to keep temperature fluctuations small with respect to the molecular weight changes desired to be sensed. Over the temperature range 32° F. to 90° F., $P_J$ fluctuates only about 3 percent, which is tolerable for many applications. Variations in viscosity do not usually pose a very serious problem, because (a) most gases have relatively uniform coefficients of viscosity (e.g., the value for oxygen is $2.02 \times 10^{-4}$ poise, and for helium, $1.94 \times 10^{-4}$ poise); and (b) the empirical calibration of the device for any two gases can automatically take into account variations in viscosity.

There will obviously be some delay in the feed-through of gas from the pressure regulator 16 to the junction 26. In order to minimize the response time of the pressure gauge 28, all conduits and chambers in the system should be kept as small as possible. In that way the reading of the pressure at the pressure gauge 28 will be as closely as possible related to the mixture at that time being created in the mixer 14 (which itself should be small, and may simply be a T-junction connected to the two input conduits and the output conduit).

While oxygen and helium have been singled out as exemplary, because of the possible application of the system of FIG. 1 to the diving industry, it will be obvious to the reader that the composition of any other binary gas mixture composition can be measured in the same way, provided that a detectable pressure change at the pneumatic resistor junction is measurable for the smallest change in composition desired to be ascertained. This implies that there must be a dissimilarity of molecular weights of the component gases. Obviously, the greater the disparity between the molecular weights of the gases, the more sensitive is the measurement of the ratio of the two gases in accordance with the invention.

The amount of gas diverted through the pneumatic resistors is some what arbitrary, and will of course depend upon meter specifications and other system requirements. The amount necessarily must not exceed the flow demands of the gas sink.

The absolute values of $P_1$, $P_2$ and $P_J$ are also chosen to meet system requirements. In a dive, the value $P_2$ varies with the depth of the diver, and $P_1$ is selected to be some suitable value above $P_2$. Thus if $P_1 = 115$ psia and $P_2 = 15$ psia, $P_J$ will vary from 61.6 psia for pure oxygen to 36.6 psia for pure helium.

In FIG. 1, the linear pneumatic resistor 24 is shown as connected to the gas sink 18 and the viscous pneumatic resistor 22 as connected to the pressure regulator 16. However, the two resistors could be interchanged in the circuit, in which case a different junction pressure $P_J$ would apply to a pure oxygen mixture on the one hand and a pure helium mixture on the other, but, provided the reading on the pressure gauge were properly correlated with the gas composition, there would be absolutely no problem whatever in interchanging the positions of the two pneumatic resistors. This is exemplified in FIG. 3, which illustrates the use of both possible orientations in a bridge arrangement.

The bridge arrangement shown schematically in FIG. 3 is useful for increasing the sensitivity of measurement. In FIG. 3, the gas sources, mixer and pressure regulator have been omitted but it is to be understood that they are to be used in conjunction with the apparatus of FIG. 1 and would supply the gas mixture to inlet 60 of the system of FIG. 3. The gas mixture then passes from inlet 60 via demand regulator 62 to a gas sink 65 in exactly the same way as happens in FIG. 1. However, instead of having a single series combination of a viscous and linear pneumatic resistor, FIG. 3 shows a pair of such series combinations with the orientation of one of the combinations reversed with respect to the other. Thus one branch of the bridge includes the series combination of a linear pneumatic resistor 64 first and then a viscous pneumatic resistor 66, while the other branch includes first the viscous pneumatic resistor 68 and then the linear pneumatic resistor 70. A differential pressure gauge 72 is then connected between the junction points of the two series combinations, namely the junction 74 in the first branch and the junction 76 in the second branch of the bridge. The pressure swing indicated by the differential pressure guage 72 for any given change in gas composition is then approximately double the swing which would be indicated by the pressure gauge 28 in FIG. 1, for the same composition change.

Conveniently, the differential pressure gauge 72 may be calibrated so that with a flow of pure oxygen (say) through the system, the pressure gauge shows a zero reading, and with a flow of pure helium (say) through the system, the pressure gauge 72 shows a full scale reading. Then the meter can be calibrated for predetermined mixtures of the two gases so that the composition of the mixture can be accurately indicated once the calibration procedure has been completed.

Using the measuring equipment of FIG. 1 or FIG. 3, an operator can control the ratio of oxygen to helium in the gas mixture by reading the pressure gauge 28 or 72, and then making the appropriate flow rate adjustments from the oxygen and helium sources into the mixer so that the required mixture is obtained. However, this approach to gas regulation is comewhat slow and requires the intervention of a human operator. In order to regulate the oxygen-helium mixture without the intervention of a human operator and without the requirement for independent adjustment of the source flow rates, the apparatus of FIG. 4 is useful. It does require a human operator to adjust manually the control pressure corresponding to the desired gas ratio, but once this is done, the equipment automatically provides the required ratio of oxygen to helium.

In FIG. 4, a source of high pressure oxygen 80 and a source of high pressure helium 82 are provided. Again, these particular gases are exemplary and the invention is not confined to use of these particular gases. The outlet from the high pressure sources 80 and 82 connect respectively to pressure regulators 84 and 86. These may be set to maintain the same pressure or, if one gas is likely to be "preferred" with respect to the other under some circumstances, that gas may be provided at a slightly higher pressure. In diving operations, oxygen is a "preferred" gas in the sense that it is vital to the diver, and at the surface and at depths near the surface the demand for oxygen will be at least of the same order as the demand for helium. Accordingly, oxygen may be provided at the outlet of pressure regulator 84 at a slightly higher pressure than helium is provided at the outlet of pressure regulator 86.

The helium passes directly from the pressure regulator 86 into a mixer 88. However, the oxygen passes to the mixer 88 only through a differential pressure regulator 90. The oxygen path is shown schematically in the differential pressure regulator 90 as being interrupted by a valve 92. The differential pressure regulator 90 operates in response to input pressures PC and PJ applied to terminals 94, 96 respectively. The input command pressure PC is set by the operator to regulate the gas mixture, as will be described in further detail below. Oxygen passed by the differential pressure regulator 90 to the mixer 88 is mixed with the incoming helium and applied to demand regulator 98 whence it passes to a gas sink 100. As in the previous examples, the gas sink 100 may be a diver whose breathing controls the flow of gas from demand regulator 98 to the lungs.

The helium path rather than the oxygen path could have been interrupted by the differential pressure regulator, but because of the much greater volume of helium flow for diving operations, the regulator is best placed in the oxygen path, for diving applications. Gas from the mixer 88 also passes to gas sink 100 via viscous pneumatic resistor 102 and linear pneumatic resistor 104. The sequence of the two resistors is again arbitrary, but the manner in which the differential pressure regulator is connected to the pneumatic resistors 102, 104 depends upon the order in which the resistors appear in the system. The connections are described and illustrated for the sequence in which the viscous resistor precedes the linear resistor in the gas flowpath.

FIG. 5 illustrates a suitable differential pressure regulator 90. The regulator comprises an external leak proof housing 106, into which gas ports or terminals 94, 96, 108 and 110 penetrate. Two gas-tight diaphragms 112, 114 are stretched across the housing. Terminals 108 and 110 are provided in the interior of housing 106 with elbows 116, 118 and vertical extensions 120, 122 which terminate in a flat plate 124 adjacent the diaphragm 112. Terminal 108 is connected to the pressure regulator 84 and terminal 110 is connected to the mixer 88. When the diaphragm 112 is pressed tightly against the plate 124, substantially no flow from terminal 108 to terminal 110 is possible. However, if the diaphragm 112 is permitted to move away from the plate 124, then gas can flow from terminal 108 through the space underneath plate 124 to terminal 110.

Mounted between the diaphragms 112 and 124 is an incompressible, conveniently frustoconical element 126 having its larger diameter base 127 immediately in contact with the diaphragm 114 and its smaller diameter upper surface 129 in contact with the diaphragm 112 immediately beneath the plate 124. Mounted beneath the diaphragm 114 is a shallow funnel-shaped cavity 128 communicating with the pressure port 96. Communicating with the chamber 130 between the diaphragms 112 and 114 is the pressure port 94.

The ratio of the area of the base 127 of frustoconical incompressible element 126 in contact with the diaphragm 114 to the area of the surface 129 in contact with the diaphragm 112, i.e., the mechanical advantage of the element 126, should be sufficiently large that the force due to the pressure of oxygen in vertical conduit 120 will not be sufficient to overcome the force exerted by the pressure $P_J$ applied at port 96. A ratio of the order of 50 to 1 may be considered to be representative, but the specific ratio chosen will depend upon the overall system design.

The area through which the pressure $P_C$ applied at terminal 94 can operate should preferably be of the same order of magnitude as the area over which the pressure $P_J$ operates.

If the junction pressure $P_J$ exceeds the command pressure $P_C$, then the incompressible element 126 will seal shut the diaphragm 112 against the plate 124 and thus oxygen will not pass from conduit 108 to conduit 110. If, however, the pressure $P_C$ exceeds the pressure $P_J$, then the diaphragm 114 is forced downwardly and pressure exerted upwardly by the element 126 on the diaphragm 112 is released. Accordingly, oxygen can flow from conduit 120 to conduit 122. A little reflection on the operation of the system will reveal that this action maintains the oxygen-helium ratio in the mixture substantially constant. If there is too much helium in the mixture, the pressure $P_J$ will drop, permitting the pressure $P_C$ to overcome the pressure $P_J$ and to permit oxygen to flow from conduit 120 to conduit 122. Similarly, if there is too much oxygen, the pressure $P_J$ will rise, overcoming the command pressure $P_C$, and the upward pressure on element 126 will cut off the flow of oxygen from conduit 120 to conduit 122.

Figure 6:
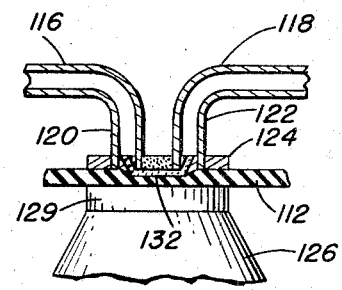
FIG. 6 is an expanded schematic view of a portion of the differential pressure regulator of FIG. 5, illustrating a preferred modification thereof.

With the system of FIG. 4, including the pressure regulator of FIG. 5, there is a risk that a certain "oscillation" in the system will develop as the valve 92 alternately opens and closes. In order to reduce valve flutter and to provide a more even flow of oxygen into the mixer 88, the system damping can be adjusted to prevent oscillatory action. One mechanical method of accomplishing appropriate damping is illustrated in FIG. 6. FIG. 6 is a blow-up of that portion of the pressure regulator of FIG. 5 in the vicinity of the lower ends of conduits 120 and 122 in the plate 124 of the diaphragm 112. If a small C-shaped element or the like, shown as 132 in FIG. 6, is placed to prevent the diaphragm 112 from coming into absolutely flat contact with the plate 124 in the vicinity of the openings of conduit 120 and 122, then there tends to be always some very slight flow of oxygen even with full pressure applied at pressure port 96, because of a separation of the diaphragm 112 from the plate 124 in the vicinity of the conduit openings for conduits 120 and 122. This permits a more damped valve action for the valve 92, and a more even flow of oxygen into the mixer 88. Since oxygen is substantially always in demand, there is no harm in maintaining a very slight flow at all times provided that this flow is no greater than the minimum oxygen demand that will be made upon the system by the gas sink 100.

Other ways of constructing the differential pressure regulator will occur to those skilled in the art. In the state of the art, it is possible to compensate diaphragm 112 so that its displacement is not influenced by the input oxygen pressure. It is also possible to add viscous damping to the action of the diaphragm 112 or cone 126. These features are detailed engineering considerations which are known to the art of pneumatic servo mechanism design.

The embodiment of FIG. 4 enables the partial pressure of the oxygen in the oxygen-helium mixture to be regulated by adjusting a control pressure $P_C$ in the differential pressure regulator 90. The apparatus of FIG. 7 enables the operator to set a desired input partial pressure which will be maintained substantially constant over the depth of the dive. In order to accomplish this, a separate unit, namely a partial pressure regulator, is added to apparatus which is otherwise very similar to that illustrated in FIG. 4. For reasons involving mathematical and mechanical simplicity, it is necessary to interchange the two pneumatic resistors so that the linear pneumatic resistor is connected directly to the gas mixture at pressure $P_1$, and the viscous pneumatic resistor is connected directly to the gas sink at a pressure $P_2$.

Figures 7, 8:
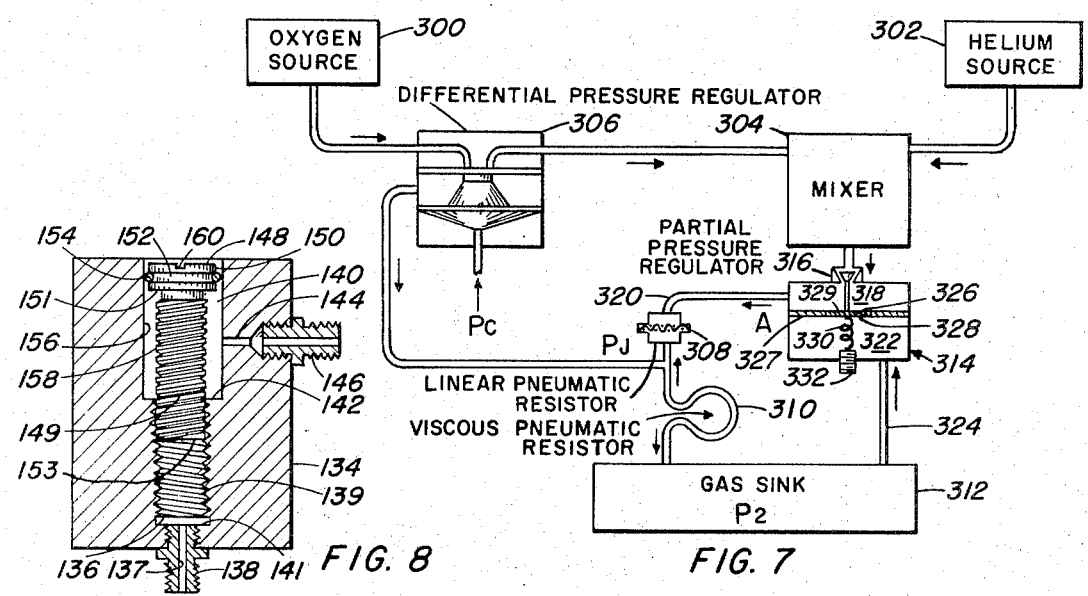
FIG. 7 is a schematic diagram of a binary gas mixture composition regulator in which the partial pressure of one of the two gases is maintained substantially constant.
FIG. 8 is a cross-section elevation view of a variable viscous pneumatic resistor which can be utilized in association with apparatus according to the invention.

Thus in FIG. 7, an oxygen source 300 and helium source 302 provide oxygen and helium respectively to a mixer 304. The amount of oxygen flow to the mixer 304 is regulated by the differential pressure regulator 306, which functions in a manner analogous to the differential pressure regulator 90 of FIG. 4, one difference being that the junction pressure $P_J$ in FIG. 7 will be different from that prevailing at junction pressure input 96 in FIG. 4 because of the interchange in position of the linear pneumatic resistor and viscous pneumatic resistor respectively. (This creates no special problems, but simply requires that equation (3) be applied correctly to the changed layout). In FIG. 7, it can be seen that the output of the mixer 304 passes first through linear pneumatic resistor 308 and then through viscous pneumatic resistor 310. Arbitrarily, in FIG. 7 the linear pneumatic resistor 308 is shown schematically as a membrane, and the viscous pneumatic resistor 310 as a coiled length of tubing.

Another important distinction from FIG. 4 is that in FIG. 7, the junction pressure $P_J$ obtained between pneumatic resistors 308 and 310 is applied to the central chamber of differential pressure regulator 306, while the control pressure $P_C$ is applied to the lowermost chamber.

The main distinction between the apparatus of FIG. 7 and that of FIG. 4, however, is the presence in FIG. 7 of a partial pressure regulator 314 (which is also a type of differential pressure regulator) interposted between the mixer 304 and the linear pneumatic resistor 308, and also receiving, by way of "feedback," input gas from the gas sink 312 at pressure $P_2$. It can be seen that gas passes from the output of mixer 304 past valve 316 into chamber 318 of regulator 314, and thence via conduit 320 to the linear pneumatic resistor 308. The gas at pressure $P_2$ from the gas sink 312 is applied by an input conduit 324 to a chamber 322 of regulator 314.

Diaphragm 326 exposes an area $A_1$ to the pressure in chamber 318 and exposes an area $A_2$ to the pressure in chamber 322. Diaphragm 326 is connected by two flexible annular membranes 328, 329, to a wall 327 (separating chamber 318 from chamber 322). On that side of wall 327 facing chamber 322, membrane 328 is provided, and on the side of wall 327 facing chamber 318 membrane 329 is provided. Diaphragm 326 opens the valve 316 when the force applied to it from the underside (as viewed in the drawings) exceeds the force applied to it from chamber 318. Similarly, valve 316 closes when the force applied from chamber 318 is sufficient to overcome the force applied to the underside of diaphragm 326. The force applied to the underside of diaphragm 326 comprises (1) spring force applied by a coil spring 330 whose tension is adjusted by adjusting screw 332, and (2) the gas pressure $P_2$ in chamber 322, contributed via conduit 324 from the gas sink 312, times the exposed area $A_2$ of diaphragm 326. The force applied to the top side of diaphragm 326 from chamber 318 is the gas pressure $P_1$ in chamber 318 times the exposed area $A_1$ of diaphragm 326.

If pressure $P_C$ is maintained at a constant value relative to pressure $P_2$ by gas pressure or mechanical force, the differential pressure regulator 306 will adjust the gas mixture to maintain junction pressure $P_J$ equal to control pressure $P_C$ as described above with reference to FIG. 4. If the output pressure $P_1$ from the mixer 304 is regulated automatically in a linear manner in dependence upon the sink pressure (e.g., diver's ambient breathing pressure) $P_2$, a substantially constant oxygen partial pressure $P_{02}$ at any sink pressure $P_2$ can be obtained. An initial bias adjustment on the partial pressure regulator 314 by means of an adjustable mechanical force (spring) or gas pressure will set the desired $P_{02}$ value, and the action of increasing $P_2$ with depth will adjust $P_1$ to maintain this preset value of $P_{02}$. In the example of FIG. 7, the adjustable force is mechanical rather than pneumatic, and is obtained by adjusting the displacement of screw 332, which has the effect of increasing or decreasing the force exerted by coil spring 330 on diaphragm 326.

The action of partial pressure regulator 314 can be analyzed mathematically as follows, using the symbols previously defined:

$$F_L = A \sqrt{M/RT}(P_1 - P_J) \quad (4)$$

$$F_V = BM/VRT \,(P_J - P_2)\,[P_J + P_2/2] \quad (5)$$

In series, $F_L = F_V$,
Therefore, $P_1 = P_J + B/2AV \sqrt{M/RT}\,[(P_J^2 - P_2^2)]$ (6)

Since pressures are absolute, $$P_1 = P_{1G} + P_2$$

and $$P_J = P_{JG} + P_2$$

where
$P_{1G}$ is the gauge pressure of $P_1$ relative to $P_2$,
$P_{JG}$ is the gauge pressure of $P_J$ relative to $P_2$.
Then $$P_{1G} = P_{JG} + B/2AV \sqrt{M/RT}\,[(P_{JG}^2 + 2P_{JG}P_2)] \quad (7)$$

It is possible to express $M$ the mean molecular weight of the gas mixture and $V$ the mean viscosity of the gas mixture in terms of $m_{02}$ the oxygen fraction of the gas mixture and then in terms of $P_{02}$ the partial pressure of oxygen measured at $P_2$ (the absolute pressure of the breathing mixture, which is equal to the absolute depth of sea water in a dive).

For oxygen, $M = 32; V = 2.02 \times 20^{-4}$ poise.
For helium, $M = 4; V - 1.94 \times 10^{-4}$ poise.
Then the value M of the mixture
$= m_{02}\,32 + 4\,(1 - m_{02})$
$= 28\,m_{02} + 4 = 4\,(7m_{02} + 1),$
and the value $V$ of the mixture
$= [m_{02}\,2.02 + (1-m_{02})1.94] \times 10^{-4}$
$= (0.08\,m_{02} + 1.94) \times 10^{-4}$ poise. The mean viscosity varies nonlinearly with mole fraction but is presented here as a linear function for illustrative purposes only.

Now $m_{02} = P_{02}/P_2$
Therefore, the value $M$ of the mixture $= 4(7\,P_{02}/P_2 + 1)$, and the value $V$ of the mixture $= 0.08\,(P_{02}/P_2 + 24.25) \times 10^{-4}$ poise.
Inserting these values into equation (7), one obtains:

$$P_{1G} = P_{JG} + B/2A\,\sqrt{RT}\,[2\,\sqrt{P_2}\,\sqrt{7P_{02} + P_2}\,(P_{JG}^2 + 2P_{JG}P_2)]/[8 \times 10^{-6}\,(P_{02} + 24.25P_2)] \quad (8)$$

The value $B/(8 \times 10^{-6}\,A\ \ RT)$ is a function of the geometry of the resistors and temperature, and can be abbreviated by the constant C.
Then $P_{1G} = P_{JG} + [C\,\sqrt{P_2}\,\sqrt{7P_{02} + P_2}\,(P_{JG}^2 + 2P_{JG}P2)]/(P_{02} + 24.25\,P_2)$ (9)

In equation (9), when $P_{1G}$ is plotted versus $P_2$, an almost linear relationship can be seen for various practical values of $P_{02}$. This means that for a pressure $P_{JG}$ maintained equal to a constant $P_{CG}$ ($P_C = P_{CG} + P_2$) by the differential pressure regulator 306, the initial bias set of regulator 314 will determine the partial pressure $P_{02}$, which will be maintained substantially constant as $P_2$ changes.

The slope of $P_{1G}$ vs. $P_2$ is set by the relative areas of diaphragm exposure in the regulator 314. If the area of the diaphragm facing chamber 318 is designated $A_1$ and the area of the diaphragm facing chamber 322 is designated $A_2$, then
$P_1A_1 = P_2A_2 + F_s$, where
$F_s$ = force exerted by spring 330.
From this, one can derive $$P_{1G} = (F_s/A_1) + P_2[(A_2/A_1) - 1].$$

As mentioned above with reference to FIG. 1, in order to keep the response time short, the conduits and chambers used in the control systems of FIGS. 4 to 7 should be kept small.

In practicing the invention, it may be desired to vary the pneumatic resistance values of the linear pneumatic resistor and the viscous pneumatic resistor. Because of the dimensions involved, variation of the linear pneumatic resistance can best be effected by substituting one porous membrane for another. However, the dimensions of the viscous pneumatic resistor are more readily adapted to mechanical adjustment, and to that end FIGS. 8 to 12 illustrate a number of mechanical devices which make possible the adjustment of viscous pneumatic resistance.

First referring to FIG. 8, a variable viscous pneumatic resistor is shown comprising a cylindrical body 134 having a central threaded bore 136 communicating via passage 137 with a threaded terminal 138. The threaded bore extends from the passage 137 upwards to about half way along the axial length of body 134, at which point it meets a smooth walled cylindrical bore 140 of larger diameter than the threaded bore 136, forming a seat 142 at the transition zone. A passage 144 connects the cylindrical bore 140 to threaded terminal 146. A generally cylindrical adjusting screw 148 is provided with a lower threaded portion 149 engaging the threads 139 of the threaded bore 136 of the body 134. The upper portion 150 of the screw 148 is in the form of a smooth cylinder of just slightly smaller outer diameter than the inner diameter of the cylindrical bore 140. A circumferential recess 152 retains a sealing deformable O-ring 154 which presses against the side wall 154 of the bore 140, forming a gas-tight seal. A slot 160 in the top of the screw 148 enables the screw 148 to be turned by a screwdriver or like implement. At the lower limit of travel of screw 148, the underside 151 of the top portion 150 of the screw 148 engages seat 142 to prevent the base 153 of screw 148 from contacting the seat 141 of threaded bore 136 (thus tending to prevent damage to the threads).

Figures 9, 11, 12:
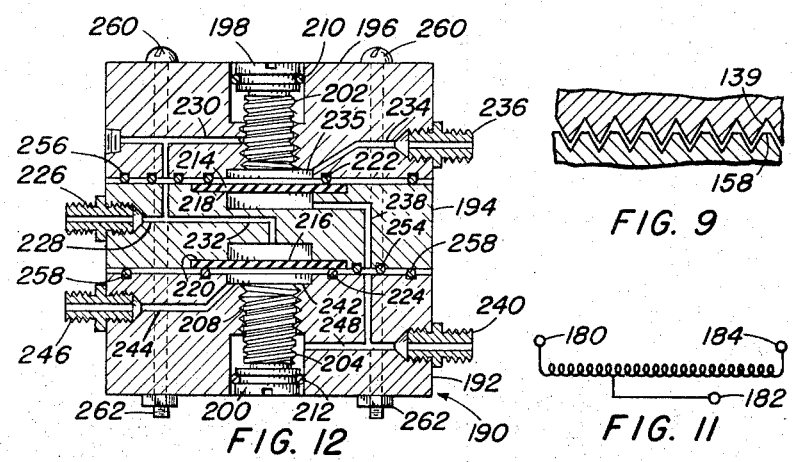
FIG. 9 is a detail cross-section view of the threaded portions of the variable resistor shown in FIG. 8.
FIG. 11 is a schematic diagram representing the variable pneumatic potentiometer of FIG. 10.
FIG. 12 is a cross-section elevation view of a parallel combination of variable viscous pneumatic resistors and linear pneumatic resistors, suitable for use in the apparatus schematically illustrated in FIG. 3.

The threads 139 of the bore 136 may be conventional V-shaped threads (i.e., of triangular cross-section). The mating threads of the screw 148, however, have their thread tops cut off to form threads of trapezoidal cross-section. FIG. 9 shows an enlargement of the engagement of the threads 158 with the threads 139. The object is to create a helical path for the passage of gas from (say) terminal 146 via passage 144 into the bore 140, thence along the helical path formed between the cut-off tops of threads 158 and the troughs of threads 139 thence to the threaded bore 136, and finally via passage 137 to terminal 138. In order to ensure that the gas path along the threads is a helical path as described, it is essential that substantially no gas leakage occur between adjacent troughs of threads 139 via the troughs of threads 158. One way of accomplishing this is to choose as the material out of which body 134 is constructed a hard unyielding material (e.g., some workable metal such as brass) and to choose as the material out of which the screw 148 is made a somewhat deformable material, for example, nylon, and then to machine the mating threaded portions such that the nominal thread diameter of the threaded portion 149 of screw 148 is slightly larger than the nominal thread diameter of the threaded bore 136 of the body 134.

The extent to which the tops of threads 158 are cut off is to a large extent a matter of the designer's discretion, but sufficient material should remain on the threads 158 to effect an adequate seal with the tops of the threads 139. Of course, the required characteristics of a viscous pneumatic resistor must be met, which means that the triangular cross-section dimensions of the helical path formed by the threaded engagement of the screw with the threaded bore 136 should be large in comparison with the mean free path of the molecules in the gas mixture passing through the variable resistor, and also the length of the helical path should be long in comparison with the cross-sectional dimensions. (This implies that the device may not give satisfactory results for slight engagement of threads 158 with threads 139, i.e., when screw 148 is in the upper range of its path of travel).

A variable pneumatic resistor according to FIG. 8 found suitable for use with the gases oxygen and helium was provided with a threaded bore 136 having a nominal thread diameter of one-half inch, 20 threads per inch, with the thread tops of the screw cut so that the final diameter was 0.493 inches.

Figure 10:
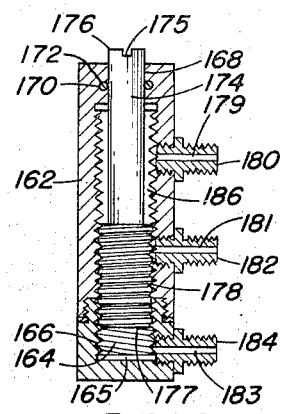
FIG. 10 is a cross-section elevation view of a variable viscous pneumatic potentiometer based on the principle of operation of the variable pneumatic resistor of FIG. 8.

The variable pneumatic resistor principle can be extended to create a variable pneumatic potentiometer, an embodiment of which is illustrated in FIG. 10. A cylindrical body 162 of brass or the like is provided with an interior threaded bore 164 terminating at the lower end at a flat 165 and at the upper end in a smooth cylindrical bore 168. A generally cylindrical adjustment screw 176 is provided with an upper smooth cylindrical portion 174 and a lower threaded portion 178. The screw 176 may be constructed of nylon or the like, and the tops of the threads are cut off as was previously described with respect to FIG. 8.

A recess 170 in the curved smooth cylindrical surface 168 of the body 162 retains a deformable O-ring 172 which effects a gas-tight seal between the surfaces 168 and 174. A slot 175 is provided for engagement by a screwdriver or the like to turn the screw 176.

Three gas passages 179, 181, 183 are provided along the threaded bore 164, the distance between the two passages 179 and 181 being equal to the distance between the two passages 181, 183. The three passages terminate in threaded terminals 180, 182, 184 for connection to other gas conduits. The length of the threaded portion 178 of screw 176 is chosen to be equal to the distance between the two ports 179, 181.

Assume, by way of illustration, that the terminal 180 is the inlet terminal and terminal 184 the outlet terminal, with terminal 182 providing an intermediate pressure. The gas then flows into passage 179, freely through the space between surface 174 and the inner threaded walls of bore 164, thence along the helical path formed by the engaging screw threads to the space between the lower surface 177 of the screw 176 and the flat 165, and finally out the passage 183 to terminal 184. The pressure at passage 181 and thus at terminal 182 will depend upon the respective lengths of the helical paths formed above and below passage 181. With the screw 176 fully inserted into the bore 164, there will be free flow between terminals 180 and 182 and thus no pressure drop across that pair of terminals, and the full pressure drop will occur in such instance between terminals 182 and 184. Conversely, with the screw 176 fully retracted in the bore 164, there will be free flow and thus no pressure drop between terminals 182 and 184, and the total pressure drop in the system will occur between terminals 180 and 182. Thus the pneumatic potentiometer of FIG. 10 functions pneumatically in a manner directly analogous to a conventional electrical potentiometer, and may be symbolically represented by the schematic diagram shown in FIG. 11, indicating that the pressure at terminal 182 may be varied to coincide with the pressure at terminal 180, or with the pressure at terminal 184, or may be any pressure in between.

FIG. 12 is an embodiment of a parallel combination of linear and viscous pneumatic resistors suitable for use in the apparatus of FIG. 3, in which both viscous pneumatic resistors are variable in accordance with the principal of operation described above with reference to FIG. 8.

The device of FIG. 12 includes a cylindrical body portion generally indicated as 190 which can conveniently be manufactured out of three separate sub-units 192, 194, 196. Adjustment screws 198, 200 are provided with flat-topped threaded portions 202, 204 respectively which mate with corresponding threaded portions 206, 208 of sub-units 196 and 192. Sealing O-rings 210, 212, are provided and function in the same manner as described previously with reference to FIG. 8. A detailed discussion of the operation of these adjustment screws and their interaction with the body portions is not believed to be necessary, since these are in all respects analogous to the operation described previously with respect to FIG. 8.

Additionally, means are provided associated with the body for retaining two linear pneumatic resistors in the form of porous membranes 214, 216 respectively. The membranes 214, 216 are mounted in recesses 218, 220 respectively formed in the body sub-unit 194. O-rings 222, 224 are provided to ensure a gas-tight seal around the periphery of the porous membranes 214, 216.

An inlet gas terminal 226 communicates with conduit 228 (which can be considered, for purposes of illustration, to be the input conduit) which is provided with two input branches 230, 232. Gas passing along input conduit 230 first passes through the adjustable viscous pneumatic resistor formed by the helical path along the engaged threaded portions 202, 206 of the adjustment screw 198 and the body portion 196 thence to chamber 235. This chamber communicates via conduit 234 with a first gauge terminal 236. The gas passes from chamber 235 through porous membrane 214 to an outlet conduit 238 and thence to outlet terminal 240.

Gas entering the other input conduit branch 232 first passes through porous membrane 216 to a chamber 242, which communicates via conduit 244 with a second gauge terminal 246, and thereafter passes along the helical path formed by the engaging threaded portion 204, 208 to outlet conduit 248 which as shown, leads to output terminal 240.

It can be seen that the input gas passes via conduit branch 230 first through a viscous pneumatic resistor and then through a linear pneumatic resistor to the output terminal 240, whereas gas entering input conduit branch 232 passes first through a linear pneumatic resistor and then through a viscous pneumatic resistor to the output terminal 240. In many cases the output terminal will simply be connected to the ambient atmosphere (which is a particular case of a "gas sink").

The gauge pressure terminals 236 and 246 will be connected one to either side of the differential pressure gauge if the apparatus of FIG. 12 is used in the system described in FIG. 3.

In order to assemble the components in gas-tight manner, small O-rings 242, 254 may be provided to surround the gas conduits machined into the body, and large O-rings 256, 258 may be provided between adjacent body sub-assembly portions. The entire assembly can be held together by suitably spaced bolts 260 and nuts 262.

It will be noted that terminal 226 was arbitrarily selected as the input terminal and terminal 240 arbitrarily selected as the output terminal in the above description. Obviously the two terminals could be interchanged with terminal 240 acting as input terminal and 226 as output terminal, without in any way impairing the utility of the device.

What is claimed is:

1. A binary gas mixture regulator comprising:
    means for obtaining a source of a first gas at a first predetermined pressure;
    means for obtaining a source of a second gas at a second predetermined pressure, means for mixing the first and second gases obtained from the first and second gas source means and for providing an output of the gas mixture;
    a differential pressure regulator responsive to a third and a fourth input pressure and connected in series between the mixing means and first gas source means and adapted to pass gas from the first gas source means to the mixing means at a rate tending to maintain the third input pressure substantially equal to the fourth input pressure;
    a linear pneumatic resistor and a viscous pneumatic resistor connected in a series combination to the output of the mixing means;
    a junction between the pneumatic resistors, said junction being connected to said differential pressure regulator to provide said fourth input pressure; and
    means for controlling the third input pressure.

2. Apparatus for controlling the relative amounts of two known gases of different molecular weights delivered to a gas sink from separate sources of said gases, comprising:
    a differential pressure regulator whose input is connected to the source of one of the gases, said differential pressure regulator being responsive to a first input pressure and to a second input pressure applied in opposition to the first input pressure and passing said one gas from the input to the output of the regulator only when the first input pressure exceeds the second input pressure;
    a mixing chamber connected to the output of the regulator and to the source of the other of the gases and supplying the gas sink with a mixture of said gases;
    a series combination of a viscous pneumatic resistor and a linear pneumatic resistor, said combination defining a pneumatic flowpath between the mixing chamber and the gas sink;
    means for applying the pressure at the junction of the linear and viscous pneumatic resistors as said second input pressure to the differential pressure regulator; and
    means for applying said first input pressure to the differential pressure regulator.

3. Apparatus as defined in claim 2 wherein the differential pressure regulator comprises a diaphragm connected to and controlling a valve connected between the source of the said one gas and the output of the differential pressure regulator, the first input pressure being applied to one side of the diaphragm and the second input pressure being applied to the other side of the diaphragm.

4. Apparatus as defined in claim 2 wherein the means for applying said second input pressure is adjustable as to pressure, whereby the relative amounts of said gases supplied to the gas sink can be varied by adjusting the second input pressure.

5. Apparatus as defined in claim 2 wherein the means for applying said second input pressure is adjustable as to pressure, whereby the relative amounts of said gases supplied to the gas sink can be varied by adjusting the second input pressure, and wherein the differential pressure regulator comprises a diaphragm connected to and controlling a valve connected between the source of the said one gas and the output of the differential pressure regulator, the first input pressure being applied to one side of the diaphragm and the second input pressure being applied to the other side of the diaphragm.

6. Apparatus as defined in claim 2 wherein the means for applying said second input pressure is adjustable as to pressure, whereby the relative amounts of said gases supplied to the gas sink can be varied by adjusting the second input pressure, wherein the differential pressure regulator comprises a diaphragm connected to and controlling a valve connected between the source of the said one gas and the output of the differential pressure regulator, the first input pressure being applied to one side of the diaphragm and the second input pressure being applied to the other side of the diaphragm, and wherein a partial pressure regulator including a diaphragm connected to and controlling a second valve is connected between the mixing chamber outlet and the input end of the series combination, the input series combination pressure being applied to one side of said last-mentioned diaphragm and a third pressure being applied to the other side of the said last-mentioned diaphragm.

7. Apparatus for controlling the relative amounts of two known gases of different molecular weights delivered to a gas sink from separate sources of said gases, comprising:
   a differential pressure regulator whose input is connected to the source of one of the gases, said differential pressure regulator being responsive to a first input pressure and to a second input pressure applied in opposition to the first input pressure and passing said one gas from the input to the output of the regulator only when the first input pressure exceeds the second input pressure;
   a mixing chamber connected to the output of the regulator and to the source of the other of the gases;
   a series combination of a viscous pneumatic resistor and a linear pneumatic resistor, the output of the series combination supplying the gas sink, wherein the linear pneumatic resistor is next to the input of the series combination and the viscous pneumatic resistor is next to the output of the series combination;
   means for applying the pressure at the junction of the linear and viscous pneumatic resistors as said first input pressure to the differential pressure regulator;
   means for applying said second input pressure to the differential pressure regulator;
   a partial pressure regulator for maintaining substantially constant the partial pressure of said one of the gases over a range of gas sink pressures and having its input connected between the input end of said series combination and the outlet of the mixing chamber and responsive to a third pressure and to the pressure at the input end of said series combination applied in opposition to the third pressure, said third pressure being the sum of the gas sink pressure and a fourth pressure, said partial pressure regulator passing gas from the mixing chamber to the series combination only when the third pressure exceeds the pressure at the input end of said series combination; and
   means for applying said fourth pressure to the partial pressure regulator.

8. Apparatus as defined in claim 7, wherein the fourth pressure applying means is adjustable as to pressure, whereby the partial pressure at the gas sink of said one of said gases can be varied by adjusting the fourth pressure.

9. Apparatus as defined in claim 8, wherein the fourth pressure applying means means comprises a mechanical spring under stress and means to adjust the amount of said stress.

10. Apparatus as claimed in claim 8 wherein the partial pressure regulator comprises a diaphragm connected to and controlling a second valve connected between the mixing chamber outlet and the input end of the series combination, the input series combination pressure being applied to one side of said last-mentioned diaphragm and the third pressure being applied to the other side of said last-mentioned diaphragm.

* * * * *